(12) United States Patent
Speker et al.

(10) Patent No.: US 11,161,212 B2
(45) Date of Patent: Nov. 2, 2021

(54) LASER MACHINE FOR MACHINING WORKPIECES

(71) Applicant: TRUMPF Laser- und Systemtechnik GmbH, Ditzingen (DE)

(72) Inventors: Nicolai Speker, Pleidelsheim (DE); Markus Wirnitzer, Weil der Stadt (DE); Gunter Fischer, Moensheim (DE); Björn Sautter, Stuttgart (DE)

(73) Assignee: TRUMPF Laser—und Systemtechnik GmbH, Ditzingen (DE)

( * ) Notice: Subject to any disclaimer, the term of this patent is extended or adjusted under 35 U.S.C. 154(b) by 108 days.

(21) Appl. No.: 16/212,991

(22) Filed: Dec. 7, 2018

(65) Prior Publication Data

US 2019/0176282 A1    Jun. 13, 2019

(30) Foreign Application Priority Data

Dec. 11, 2017   (DE) .......................... 102017129479.1

(51) Int. Cl.
| | |
|---|---|
| *F24F 13/00* | (2006.01) |
| *B23Q 11/00* | (2006.01) |
| *B23K 37/04* | (2006.01) |
| *B23K 26/70* | (2014.01) |
| *B23K 26/36* | (2014.01) |

(Continued)

(52) U.S. Cl.
CPC ............ *B23Q 11/006* (2013.01); *B08B 15/00* (2013.01); *B08B 15/02* (2013.01); *B23K 26/16* (2013.01); *B23K 26/36* (2013.01); *B23K 26/70* (2015.10); *B23K 26/702* (2015.10); *B23K 37/04* (2013.01); *B23K 37/06* (2013.01)

(58) Field of Classification Search
CPC .... B23Q 11/006; B23K 23/70; B23K 26/702; B23K 6/16; B23K 6/36; B23K 37/04; B23K 37/06; B08B 15/00; B08B 15/02
USPC .......................................................... 454/256
See application file for complete search history.

(56) References Cited

U.S. PATENT DOCUMENTS 3,646,253 A  *  2/1972  Wood ...................... H04N 9/643
                                                    348/654
5,531,484 A     7/1996  Kawano
                        (Continued)

FOREIGN PATENT DOCUMENTS

| CN | 101829848 A | 9/2010 |
| CN | 104 923 924 | 9/2015 |

(Continued)

OTHER PUBLICATIONS

KR Office Action in Korean Appln. No. 10-2018-0158078, dated Jan. 11, 2021, 11 pages (with English translation).

*Primary Examiner* — Helena Kosanovic
(74) *Attorney, Agent, or Firm* — Fish & Richardson P.C.

(57) ABSTRACT

A laser machine for machining workpieces has a workpiece support that forms a support main plane and is permeable to air perpendicularly to the support main plane. Supply air is directed to an upper side of the workpiece support. Air that is contaminated due to machining is discharged as exhaust air from the upper side of the workpiece support through the workpiece support to the bottom side of the workpiece support. In order to generate a laminar supply air flow which is perpendicular to the upper side of the workpiece support, the flow cross section of the supply air channel is divided into partial cross sections by partial cross sectional walls.

26 Claims, 5 Drawing Sheets

(51) Int. Cl.
  *B23K 26/16* (2006.01)
  *B08B 15/02* (2006.01)
  *B08B 15/00* (2006.01)
  *B23K 37/06* (2006.01)

(56) References Cited

U.S. PATENT DOCUMENTS

2008/0065161 A1* 3/2008 Lian ................... A61N 1/3622
                                                      607/4
2009/0299330 A1* 12/2009 Mac Iver ......... A61B 17/06066
                                                     604/522

FOREIGN PATENT DOCUMENTS

| DE | 10 2014 205 875 | 10/2015 |
| EP | 0 940 585 | 9/1999 |
| EP | 3 213 859 | 9/2017 |
| JP | S63-295 090 | 12/1988 |
| JP | 2002 119932 | 4/2002 |
| JP | 5 500914 B2 | 5/2014 |
| WO | WO 2011/091650 | 8/2011 |
| WO | WO 2013/178281 | 12/2013 |
| WO | WO 2017/156802 | 9/2017 |

* cited by examiner

LASER MACHINE FOR MACHINING WORKPIECES

CROSS REFERENCE TO RELATED APPLICATIONS

This application claims priority from German Application No. 10 2017 129 479.1 filed on Dec. 11, 2017, the entire contents of which is incorporated herein by reference in its entirety.

TECHNICAL FIELD

The present invention refers to a laser machine for machining work-pieces by means of a laser.

BACKGROUND

In the laser machining of workpieces, gases and solid particles are emitted from the processing location of the laser beam serving as the machining tool. These emissions can be harmful to humans and materials. For example, in the laser machining of fibre-reinforced plastics there is a risk of contamination of the working environment with carcinogenic, mutagenic, irritating and/or odorous substances. A housing provided for a working space of a laser machining device prevents propagation of harmful emissions into the surroundings of the laser machining device during ongoing machining; however, personnel may be exposed to emissions during work done in the interior of the housing between machining operations. Due to their abrasiveness, their electrical conductivity and/or their adhesion behaviour, solid particles emitted from the processing location of a laser beam can cause mechanical damage, damage to the electrical system and/or damage to the control of the mechanical equipment used for workpiece machining.

Due to the conditions described, there is a need to pick up the emissions associated with the laser machining of workpieces as directly as possible at the place of their formation and then guide them into non-critical areas.

SUMMARY

One aspect of the invention features a laser machine for machining workpieces by means of a laser, the machine having a housing defining a working space within the housing, an air supply, and a workpiece support disposed within the working space for supporting a workpiece to be machined. The workpiece support defines a support main plane and being permeable to air perpendicularly to the support main plane, such that supply air may be directed, by means of the air supply, to an upper side of the workpiece support, with a flow direction perpendicular to the support main plane of the workpiece support, and that, by means of the air supply, supply air contaminated due to machining may be discharged as exhaust air from the upper side of the workpiece support through the workpiece support to a bottom side of the workpiece support spaced from the upper side of the workpiece support. A supply air channel passed through by supply air is positioned upstream of the housed workpiece support and is provided with internal components, by which air flowing into the supply air channel at a channel inlet remote from the workpiece support exits the supply air channel at a channel outlet on the side of the workpiece support, in the form of a laminar supply air flow perpendicular to the support main plane of the workpiece support. The channel outlet of the supply air channel on the side of the workpiece support is spaced from the upper side of the workpiece support and covers at least partially, preferably entirely, the workpiece support. The flow cross section of the supply air channel is divided into partial cross sections and partial cross sectional walls, which delimit the partial cross sections, extend in the flow direction with mutual wall distance transversely to the flow direction of the supply air. At the outlet-side end lengths, the partial cross-sectional walls of the supply air channel run parallel to one another in the flow direction and perpendicular to the support main plane of the workpiece support. To generate the supply and the exhaust air flow, for example, a negative pressure generated by means of a conventional vacuum pump can be applied to the working space in the interior of the housing of the laser machining device according to the invention.

The laminar supply air flow, which is produced by means of the supply air channel, the supply air channel functioning as a rectifier, is distributed homogeneously over the surface of the workpiece support and is thus able to effectively capture emissions generated on the workpiece surface due to machining. The laminar flow character is retained regardless of the capture of machining emissions. Due to their laminar and thus turbulence-free character, supply air flow laden with the captured emissions may move as a discharge flow on the shortest path as an exhaust air flow from the upper side of the workpiece support to the bottom of the workpiece support.

It is preferable that the exhaust air leaves the housing of the laser machine. In any case, it is possible to supply the exhaust air to a treatment unit, for example an exhaust filter.

In order to produce optimal laminar flow conditions for the removal of emissions, special technical precautions are taken individually or in combination with one another at the laser machine.

In a further development, the supply air channel may be provided, over a partial length extending from the channel inlet of the supply air channel in the flow direction of supply air and provided as an inflow length with an undivided flow cross section, and/or the mutual wall distances of the partial cross sectional walls of the supply air channel at the outlet-side end lengths of the partial cross sectional walls may be uniformly sized, and/or the mutual wall distances of the partial cross sectional walls of the supply air channel may be non-uniformly sized at the inlet-side ends directed towards the channel inlet of the supply air channel of the partial cross sectional walls, in particular in order to take into account variations of the flow speed of the supply air occurring over the flow cross section of the supply air channel, and/or the ends of the partial cross sectional walls on the inlet side, towards the channel inlet of the supply air channel and/or outlet-side ends of the partial cross sectional walls towards the channel outlet of the supply air channel may be offset relative to one another in the flow direction of supply air, and/or the supply air channel may be provided with an aperture upstream of the partial cross sectional walls, which aperture is passed through by the supply air in the flow direction and which is used, for example, for adjusting a pressure loss.

In particular, to adjust for specific spatial conditions, in a further embodiment the flow direction of the supply air varies between the channel inlet of the supply air channel and the channel outlet of the supply air channel, in that the partial cross sectional walls of the supply air channel form guide surfaces for supply air flowing to the workpiece support, wherein the supply air flowing to the workpiece support may be deflected by means of the guide surfaces preferably at right angles from the flow direction at the channel inlet to a flow direction at the channel outlet. Preferably, the partial cross sectional walls of the supply air channel extend over an inlet-side partial length in the horizontal direction and over an outlet-side partial length, arranged downstream in the flow direction of the supply air subsequent to the inlet-side partial length, in the vertical direction and thereby downwards towards the workpiece support, which is to be subjected to a laminar supply air flow.

In a preferred embodiment, a partition is provided for the working space, which partition is arranged in the interior of the housing and extends perpendicular to the support main plane of the workpiece support, and which is open to the workpiece support-side channel outlet of the supply air channel and which delimits the working space with respect to a residual space formed within the housing of the laser machining device. The partition of the working space spatially limits the propagation of machining-related emissions inside the housing. The area in the interior of the housing to be controlled by the laminar supply air flow can be limited to the immediate vicinity of the workpiece support. The volume flow of supply air required for the removal of emissions from the interior of the housing can be minimized in this way.

In a further preferred embodiment, a machine body of a laser processing unit of the laser machine, which unit is positioned within the housing laterally beside the workpiece support, is used for separating the working space from the residual space.

A particularly effective removal of emissions in the case of another configuration provided with a separate partition for the working space is ensured in that the workpiece support-side channel outlet of the supply air channel preferably entirely covers a cross section of the working space formed within the partition in parallel to the support main plane of the workpiece support. Thus, it is ensured that the supply air flow emerging from the supply air channel towards the workpiece support completely captures the emissions generated during workpiece machining.

The laser machine may be characterised by a good accessibility of the separate work area inside the housing, on which machine the partition of the working space is open towards an access side of the workpiece support provided laterally beside the workpiece support and the housing of the laser machine is provided on the access side of the workpiece support with an access-side wall with a closable access opening.

In a further preferred embodiment it is provided that a part of the workpiece support side channel outlet of the supply air channel projects in the vertical projection on the support main plane of the workpiece support with respect to the workpiece support with a projection parallel to the support main plane of the workpiece support and that supply air, which exits at the projection of the workpiece support side channel outlet of the supply air channel in the flow direction, can be deflected in the direction of the upper side of the workpiece support by means of a guide surface laterally arranged next to the workpiece support. Due to the projection of the outlet of the supply air channel with respect to the workpiece support, it is possible to provide supply air also in an area laterally beside the workpiece support and thereby keep this area generally free of machining-related emissions. The guide surface directs the supply air optionally charged with emissions as exhaust air from the area laterally beside the workpiece support to the upper side of the workpiece support, from where the exhaust air originating from the lateral area together with the supply air directly supplied on the upper side of the workpiece surface and charged with emissions may be removed.

In a further development, the projection of workpiece support-side channel outlet of the supply air channel protrudes with respect to the workpiece support towards an access side of the workpiece support provided laterally beside the workpiece support. The guide surface, which directs supply air emerging in the direction of flow on the projection of the workpiece support-side channel outlet of the supply air channel in the direction of the upper side of the workpiece support, is provided on the access side of the workpiece support, preferably on an access-side wall of the housing of the laser machine. In this way, that portion of the interior of the housing that is first entered by personnel during non-productive times, for example for loading and unloading of the workpiece support, is effectively kept free of emissions. The guide surface on the access-side wall of the housing can form a tear-off edge, by means of which the supply air emerging from the supply air channel at its lateral projection is detached from the access-side wall of the housing.

In a further preferred embodiment, in addition to an upper supply air channel opening towards the upper side of the workpiece support, a lower supply air channel is provided, through which secondary supply air may be directed, by means of an air supply device, as secondary supply air flow with an initial flow direction parallel to the workpiece main plane of the workpiece support to a lower guide surface laterally arranged next to the workpiece support, by means of which lower guide surface the secondary supply air flow may be deflected from the initial flow direction to a flow direction perpendicular to the support main plane of the workpiece support towards the upper side of the workpiece support. By means of the secondary supply air coming from the lower supply air channel, areas laterally beside the workpiece support are kept generally free of machining-related emissions from the underside of the workpiece support. The secondary supply air flow moving perpendicularly to the support main plane of the workpiece support is preferably deflected once again by means of a guide surface and thereby directed towards the upper side of the workpiece support, where it may be united with the incoming air flow from the upper supply air channel to remove emissions from the upper side of the workpiece support.

For simplicity, in a further embodiment, the lower guide surface for the secondary supply air flow is provided on the housing of the laser machine, and is preferably formed by the housing of the laser machine.

In another embodiment, the lower supply air channel is advantageously used to keep the access side of the workpiece support and thus the area primarily occupied by personnel inside the housing of the laser machine free from emissions.

In a further preferred embodiment, also the lower supply air channel is designed to generate a laminar supply air flow. The channel features provided for this purpose correspond to the measures taken at the upper supply air channel and explained in detail above.

Special technical provisions can be provided individually or in combination with one another in the laser machine for optimizing the secondary supply air flow generated by means of the lower supply air channel and correspond to above-described features of the upper supply air channel.

In some embodiments the laser machine is provided with multiple upper and/or lower supply air channels, preferably with two upper and two lower supply air channels, wherein the two upper supply air channels as well as the two lower supply air channels are arranged symmetrically with respect to a plane perpendicular to the support main plane of the workpiece support and wherein each of the supply air channels has partial cross sectional walls having an inlet side partial length extending in parallel to the support main plane of the workpiece support in the horizontal direction. At the upper supply air channels, in the flow direction of supply air, the horizontal inlet side partial length of the partial cross sectional walls are followed by outlet-side partial lengths of the partial cross sectional walls, which extend perpendicularly to the support main plane of the workpiece support downwards in the direction of the workpiece support to be subjected to the laminar flow of supply air. Outlet-side partial lengths of the partial cross sectional walls of the lower supply air channels are perpendicular to the associated inlet-side partial lengths and, like the inlet-side partial lengths are parallel to the support main plane of the workpiece support.

The invention will be explained in more detail with reference to exemplary schematic illustrations.

DETAILED DESCRIPTION

Figure 1:
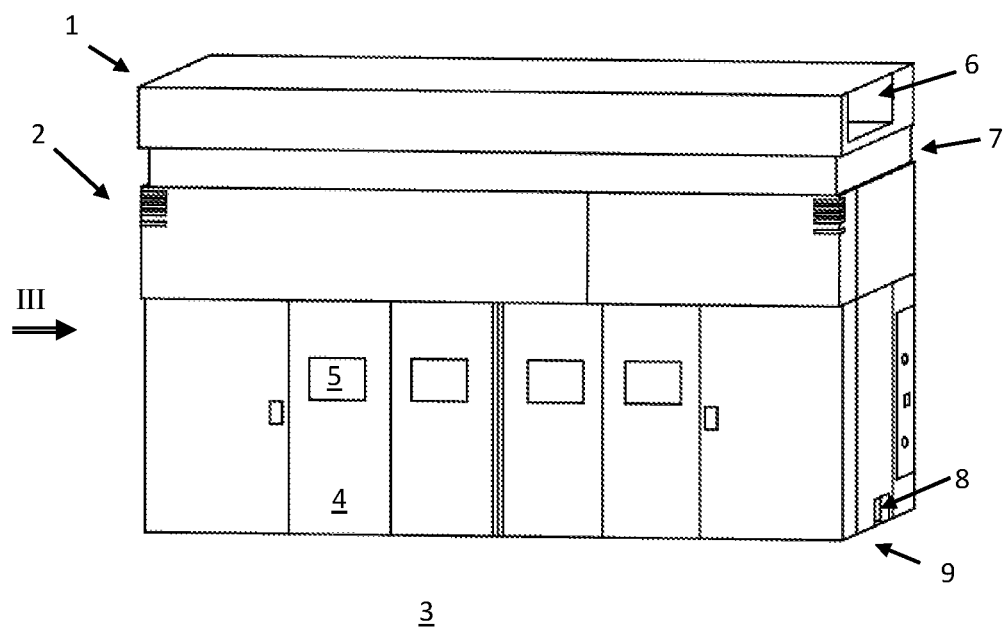
FIG. 1 shows a perspective view of a laser machine having a housing.
Figure 2:
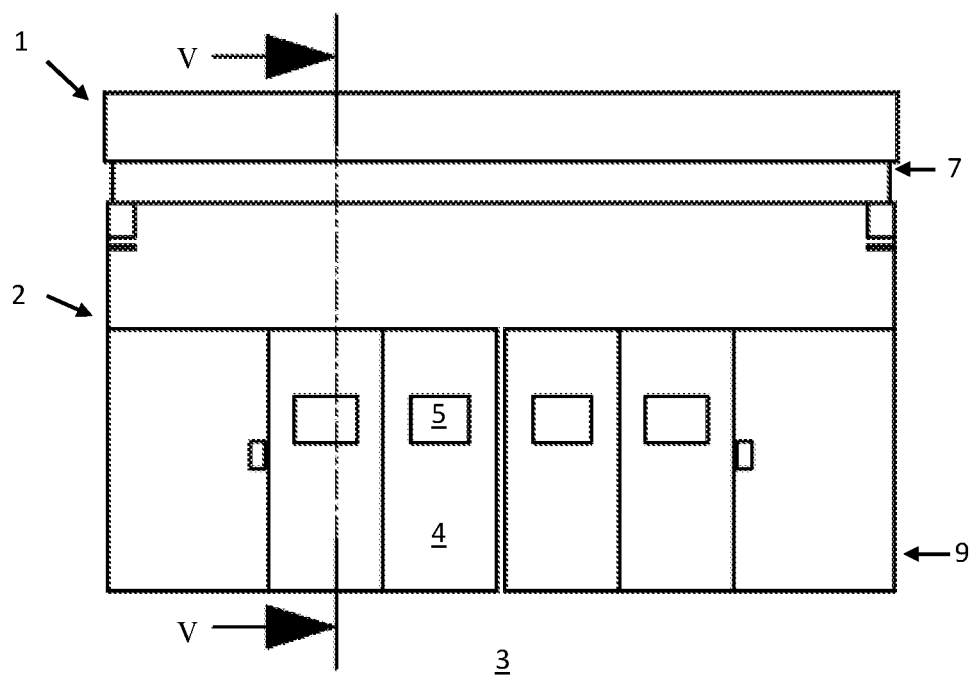
FIG. 2 shows the access side of the laser machine according to FIG. 1 in a front view.

According to FIGS. 1 and 2, a laser machine 1 has a housing 2. On an access side 3 of the housing 2 a total of four access doors 4 are provided, each with an inspection window 5. FIG. 1 also shows a first supply air channel 6, which forms a first upper supply air channel as part of a roof-side module 7, and a first lower supply air channel 8, which is provided as part of a bottom-side module 9 of the laser machine 1.

Figure 3:
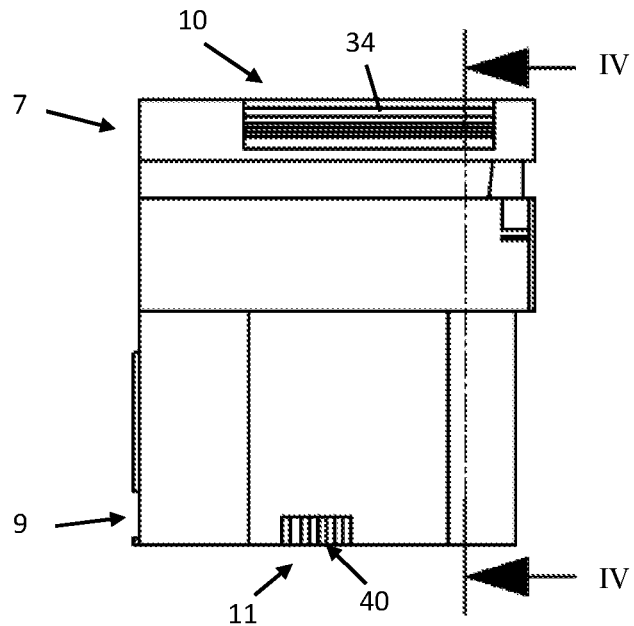
FIG. 3 shows a plan view of the laser machine according to FIG. 1 in the direction of the arrow III in FIG. 1.

FIG. 3 shows the side of the laser machine 1 which is remote from the viewer of FIG. 1. According to FIG. 3, the roof-side module 7 of the laser machine 1 has a second (upper) supply air channel 10 in addition to the first (upper) supply air channel 6 which can be seen in FIG. 1. As shown in FIG. 3, the bottom-side module 9 of the laser machine 1 is provided with a second lower supply air channel 11 in addition to the first lower supply air channel 8.

Figure 4:
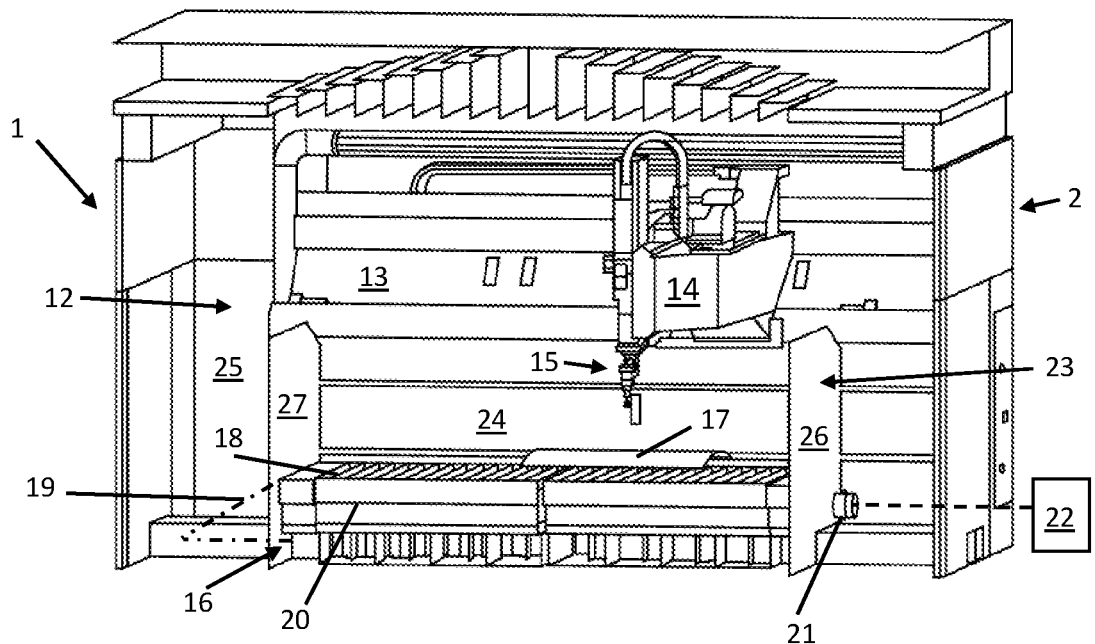
FIG. 4 shows a perspective sectional view of the laser machine according to FIG. 1 with a sectional plane indicated by the line IV-IV in FIG. 3.

In FIG. 4, the view is open into the interior of the housing 2.

In the interior of the housing 2 there is, accordingly, a laser processing machine designed as a laser cutting machine 12 of conventional design in the illustrated example. The laser cutting machine 12 has a machine body 13 as well as a boom 14 displaceable along the machine body 13, wherein at the end of the boom 14 remote from the machine body 13, a laser cutting head 15 is provided as a laser machining unit. The laser cutting head 15 is horizontally displaceable in the usual manner along the boom 14 and can be positioned in the vertical direction.

In front of the machine body 13 of the laser cutting machine 12, a conventional workpiece support 16 is arranged in the interior of the housing 2. In FIG. 4, the workpiece support 16 supports on its upper side a three-dimensional workpiece 17 to be machined by means of the laser cutting machine 12. For this purpose, the workpiece support 16 is provided with support strips 18 which extend at a mutual distance parallel to each other and form a support main plane 19, which is indicated by a dot-dash line in FIG. 4.

Due to the mutual distance of the support strips 18, the workpiece support 16 is permeable to air perpendicular to the support main plane 19. In a box-like substructure 20 of the workpiece support 16 suction openings are located, hidden in FIG. 4, which are connected to a suction line 21, which is partially shown in FIG. 4. A section of the suction line 21, which section is indicated in FIG. 4 by a dotted line, the suction line 21 extends through a lateral opening of the housing 2 to a vacuum pump 22, which is likewise only indicated in FIG. 4 and serves as an air-supplying device.

Figure 5:
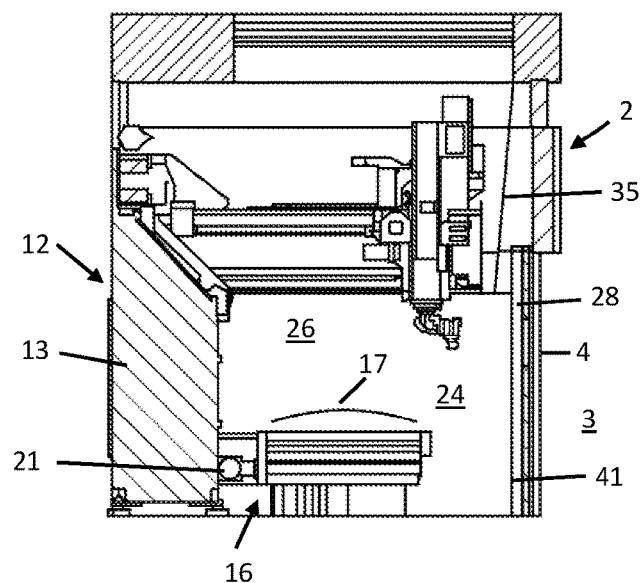
FIG. 5 shows a sectional view of the laser machine according to FIG. 1 with a sectional plane indicated by the line V-V in FIG. 2.

The interior of the housing 2 is subdivided by a partition 23 into a working space 24 lying within the partition 23 and a residual space 25 arranged outside the partition 23. The part of the partition 23 that faces the rear of the housing 2 is formed by the machine body 13 of the laser cutting machine 12. As side parts of the partition 23 side wall plates 26, 27 are provided. As shown in FIG. 5, the lateral wall plate 26 extends from the machine body 13 of the laser cutting machine 12 to an access-side wall 28 of the housing 2. The lateral wall plate 27 of the partition 23 is correspondingly dimensioned. The access-side wall 28 of the housing 2 is provided with access openings which can be closed by means of the access doors 4 shown in FIGS. 1 and 2.

The access side 3 of the housing 2 is at the same time the access side of the workpiece support 16. At the access side 3 of the housing 2 and the workpiece support 16, the working space 24 is limited by the access-side wall 28 of the housing 2. When the access doors 4 are open, the working space 24 is accessible from the access side 3.

During the laser machining of the workpieces laid on the workpiece support 16, for example, when laser cutting the three-dimensional workpiece 17 by means of the laser cutting head 5 of the laser cutting machine 12, in particular gases and solid particles are emitted from the machining site of the laser machining beam. These emissions can be detrimental to humans and material and must therefore be removed as far as possible from the working space 24. For this purpose, the laser machine 1 is provided with the two (upper) supply air channels 6, 10 of the roof-side module 7 and the two lower supply air channels 8, 11 of the bottom-side module 9. Accordingly, the working space 24 is designed as a flowbox that is permanently upwardly open, and can be opened and closed at one side thereof. The (upper) supply air channels 6, 10 are shown in detail in FIGS. 6 to 8. Constructive details of the lower supply air channels 8, 11 emerge from FIGS. 9 to 12.

Figure 6:
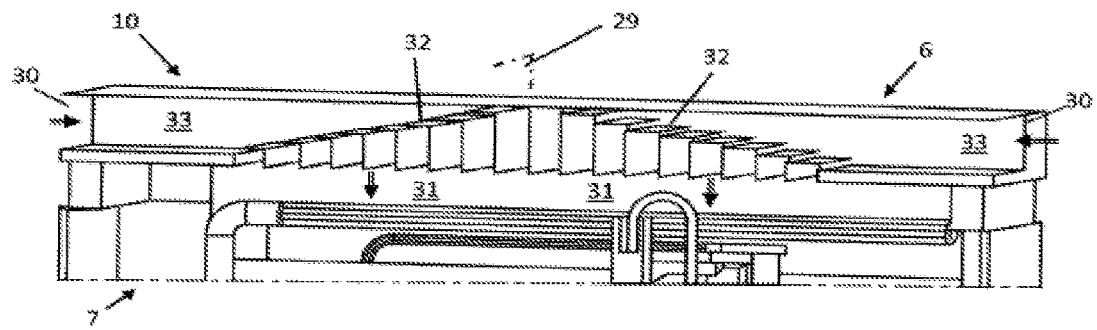
FIG. 6 shows a perspective sectional view of a roof-side module of the laser machine according to FIG. 1 having two upper supply air channels.
Figure 7:
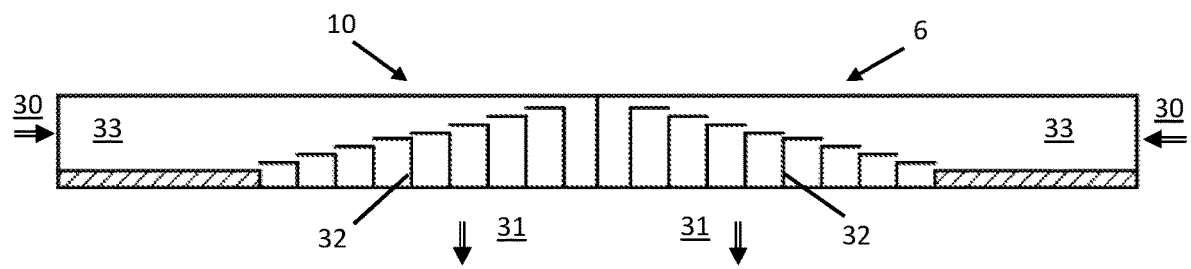
FIG. 7 shows a plan view of the upper supply air channels of the roof-side module according to FIG. 6.
Figure 8:
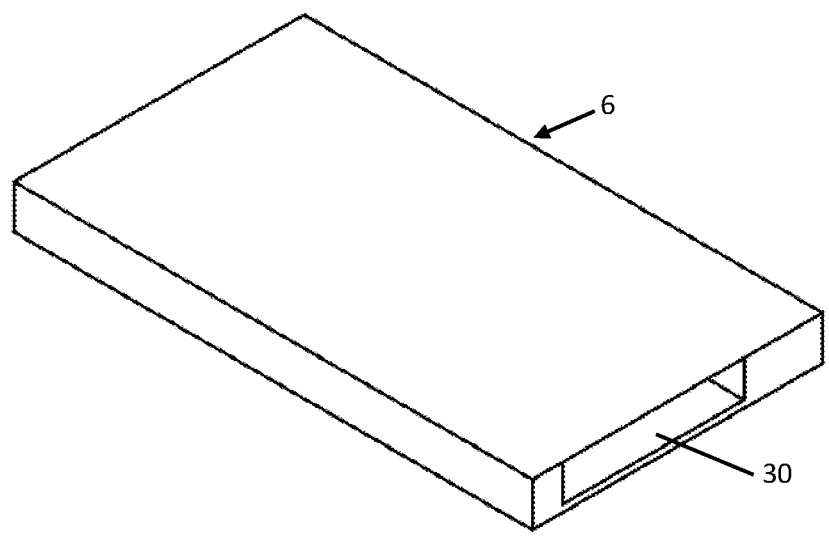
FIG. 8 shows a perspective view of one of the upper supply air channels of the roof-side module according to FIG. 6.
Figure 9:
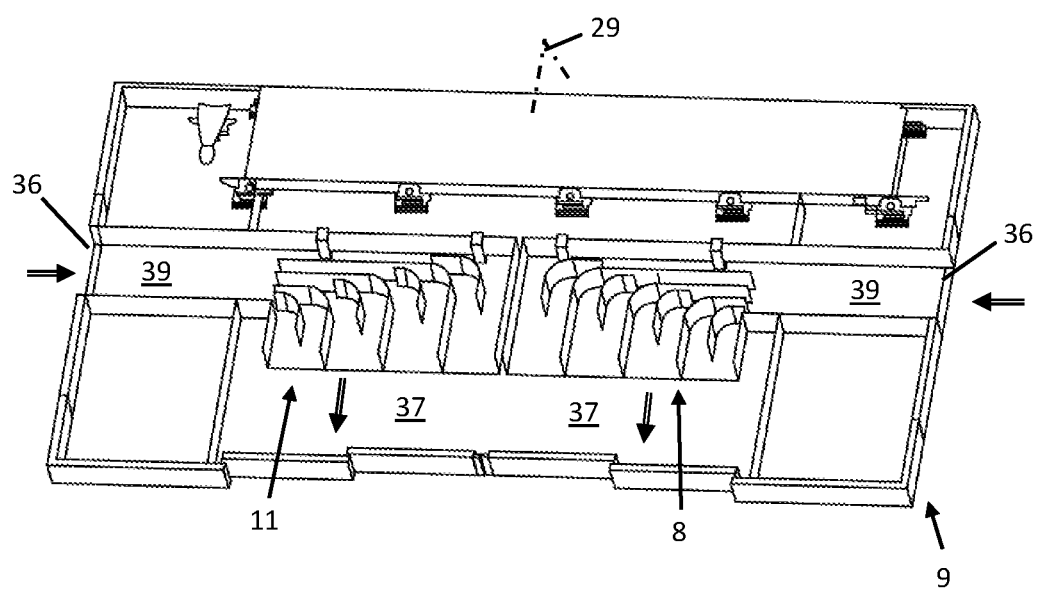
FIG. 9 shows a perspective sectional view of a bottom-side module of the laser machine according to FIG. 1 having two lower supply air channels.
Figure 10:
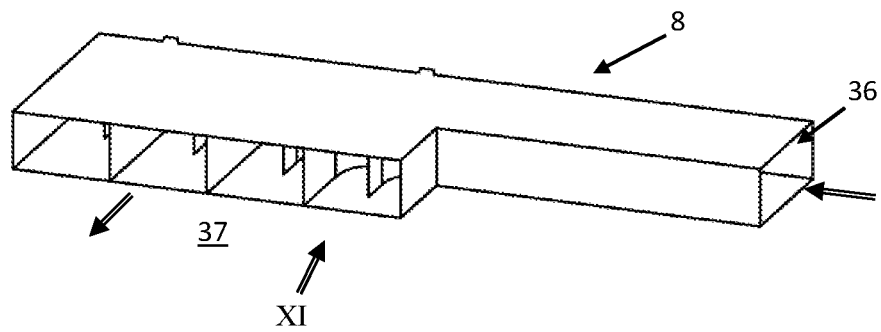
FIG. 10 shows a perspective view of one of the lower supply air channels of the bottom-side module according to FIG. 9.
Figure 11:
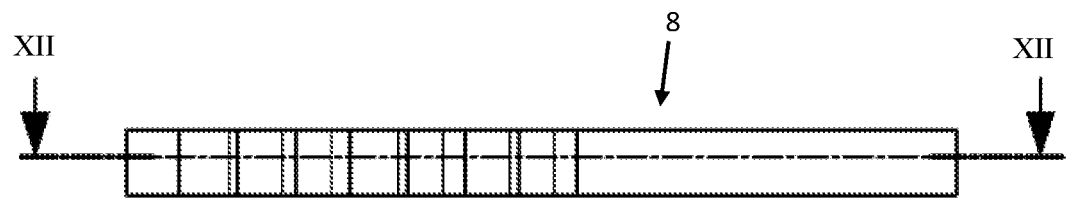
FIG. 11 shows a plan view of the lower supply air channel according to FIG. 10 in the direction of the arrow XI in FIG. 10.
Figure 12:
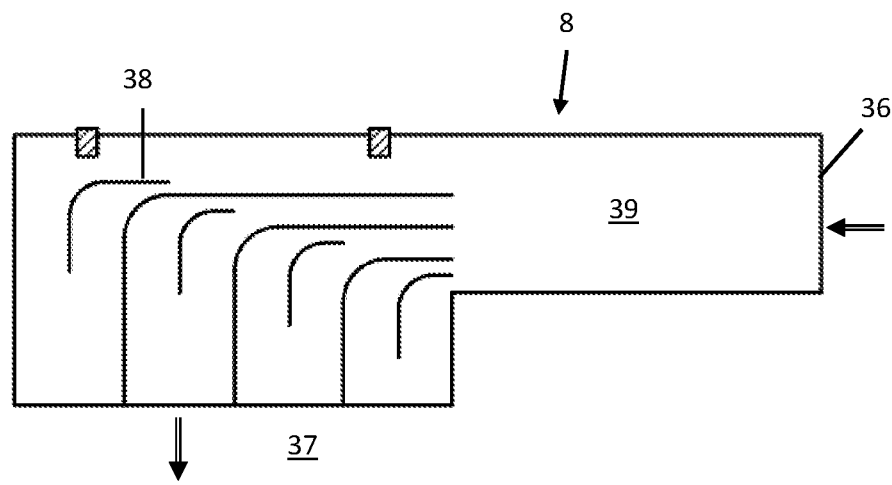
FIG. 12 shows a sectional view of the lower supply air channel according to FIGS. 10 and 11 with a sectional plane indicated by the line XII-XII in FIG. 11.

Like the two (upper) supply air channels 6, 10, the two lower supply air channels 8, 11 are also arranged symmetrically with respect to a plane 29 that extends perpendicularly relative to the support main plane 19 of the workpiece support 16 and that is indicated by a dash-dot line in FIGS. 6 and 9. Through the (upper) supply air channels 6, 10 and through the lower supply air channels 8, 11, the working space 24 of the laser machine 1 is supplied with supply air due to a vacuum provided in the working space 24 during operation of the vacuum pump 22. The supply air flows at the (upper) supply air channels 6, 10 and at the lower supply air channels 8, 11 are indicated in FIGS. 6, 7 and 9, 10 by arrows.

Under the effect of the vacuum generated by means of the vacuum pump 22, the supply air laden with emissions leaves the working space 24 as exhaust air through the workpiece support 16 via the suction line 21.

Each of the (upper) supply air channels 6, 10 has a channel inlet 30 remote from the workpiece support and a workpiece support-side channel outlet 31. The channel outlets 31 of the (upper) supply air channels 6, 11 located upstream of the workpiece support 16 are spaced from the upper side of the workpiece support 16 and thereby also arranged above the laser cutting machine 12 of the laser machine 1.

The flow cross section of the (upper) supply air channels 6, 10 is divided over a partial length of the (upper) supply air channels 6, 10 by partial cross sectional walls 32 in partial cross sections. The partial cross sectional walls 32 are at right angles in the illustrated case and form correspondingly extending guide surfaces for the supply air conveyed by means of the vacuum pump 22. The optimum geometry of the partial cross sectional walls is also dependent on the supply air volume and the installation space available, alternatively, for example, rounded partial cross sectional walls are also possible. Over a further partial length 33, extending from the channel inlet 30 in the flow direction of the supply air and provided as inlet length, the (upper) supply air channels 6, 10 have an undivided flow cross section. In the partial length 33 with undivided flow cross section, the supply air flowing into the (upper) supply air channels 6, 10 can already become laminar.

The partial cross sectional walls 32 extend with their vertical outlet-side end lengths, parallel to each other and perpendicular to the support main plane 19 of the workpiece support 16. The mutual wall distances of the partial cross sectional walls 32 of the (upper) supply air channels 6, 10 are uniformly sized at the outlet-side end lengths of the partial cross sectional walls 32 and non-uniformly sized at the inlet-side ends of the partial cross sectional walls 32, which inlet-side ends are arranged towards the channel inlet 30. In addition, the partial cross sectional walls 32 are offset relative to each other in the direction of flow of the supply air at inlet-side ends arranged towards the inlet 30, while the outlet-side ends of the partial cross sectional walls 32 are located at the channel outlet 31 in a common plane parallel to the support main plane 19 of the workpiece support 16.

If necessary, in the channel inlet 30 of the (upper) supply air channels 6, 10, a grid-like aperture 34 can be inserted, as shown in FIG. 3 at the channel inlet 30 of the (upper) supply air channel 10.

Due to the described configuration of the (upper) supply air channels 6, 10, the latter produce a laminar supply air flow, which starting from the channel openings 31 of the (upper) supply air channels 6, 10 is directed downwards in the Figures, with a flow direction perpendicular to the support main plane 19 of the workpiece support 16.

The channel outlets 31 of the two (upper) air inlets 6, 10 jointly and completely cover the cross section of the working space 24 of the laser machine 1 which working space is delimited by the partition 23. As shown in FIG. 5, a part of the channel outlets 31 of the (upper) supply air channels 6, 10 project in the vertical projection onto the support main plane 19 of the workpiece support 16 with respect to the workpiece support 16 with a projection with respect to the workpiece support 16.

Supply air, which exits at the region of the channel openings 31 of the (upper) supply air channels 6, 10 arranged above the workpiece support 16, reaches the upper side of the workpiece support 16 as a laminar supply air flow, the supply air flow, due to its laminar character, being homogeneously distributed over the upper side of the workpiece support 16. Supply air that exits in the region of the projection of the channel outlets 31 of the (upper) supply air channels 6, 10, is directed by a guide plate 35 arranged on the access side 3 beside the workpiece support 16 and forming a guide surface (FIG. 5) towards the upper side of the workpiece support 16, On the bottom side of the workpiece support 16, secondary supply air is supplied as a secondary supply air flow through the lower supply air channels 8, 11 with an initial flow direction parallel to the support main plane 19 of the workpiece support 16 into the working space 24 of the laser machine 1. Also the secondary supply air is conveyed by the vacuum applied by means of the vacuum pump 22 to the working space 24.

Each of the lower supply air channels 8, 11 has a channel inlet 36 and a channel outlet 37. The two channel outlets 37 of the lower supply air channels 8, 11 extend over the entire width of the workpiece support 16 and the working space 24 respectively.

Partial cross sectional walls 38 divide the flow cross section of the lower supply air channels 8, 11 over a partial length of the lower supply air channels 8, 11 in partial cross sections and form guide surfaces for the supply air flowing from the channel inlet 36 to the channel outlet 37. By means of the partial cross sectional walls 38, the supply air flow is deflected at a right angle.

Starting from the channel inlet 36, the lower supply air channels 8, 11 are provided, for laminar formation of the secondary supply air flowing into the lower supply air channels 8, 11 with a partial length 39 extending in the flow direction of the secondary supply air and provided as inflow length with an undivided flow cross section. The mutual wall distances of the partial cross sectional walls 38 are non-uniformly dimensioned at the partial lengths of the partial cross sectional walls 38 arranged towards the channel inlet 36, and uniformly dimensioned at the partial lengths of the partial cross sectional walls 38 which are arranged towards the channel outlet 37. The inlet-side ends of the partial cross sectional walls 38 lie in a common plane that extends perpendicularly relative to the flow direction of the secondary supply air. Outlet-side ends of the partial cross sectional walls 38 are mutually offset in the flow direction of the secondary supply air.

If the flow conditions require it, the channel inlet 36 of the lower supply air channels 8, 11 can be provided with a grid-like aperture 40. A grid-like aperture 40 at the channel inlet 36 of the lower supply air channel 11 is shown in FIG. 3.

The secondary supply air exiting the lower supply air channels 8, 11 at the channel outlets 37 in parallel to the support main plane 19 of the workpiece support 16 as a laminar secondary supply air flow passes on a lower guide surface 41 which is formed by the access-side wall 28 of the housing 2 of the laser machine 1 (FIG. 5). By the lower guide surface 41, the initially horizontal secondary supply air flow is directed vertically upwards. There, the secondary supply air flow meets the supply air flow coming from the two (upper) supply air channels 6, 10 and directed by means of the guide plate 35 towards the upper side of the workpiece support 16. The upper supply air flow and the lower supply air flow move as a united supply air flow to the upper side of the workpiece support 16, where it captures, together with the supply air flow directed perpendicularly from the (upper) supply air channels 6, 10 on to the workpiece support 16 machining-related emissions directly at the place of their formation, By means of the vacuum pump 22, the supply air polluted by the emissions is extracted as exhaust air on the shortest path through the workpiece support 16.

The supply air flow supplied through the (upper) supply air channels 6, 10 into the interior of the housing 2 of the laser machine 1 is provided as a main flow, the secondary supply air flow supplied to the interior of the housing 2 via the lower air supply channels 8, 11 is provided as a secondary flow. The volumetric flows of the main and the secondary flows are coordinated with one another. In practice, a volumetric flow ratio of main flow to secondary flow of 86%/14% has proven successful. However, the optimum ratio is dependent on geometrical parameters of the housing 2, in particular the size of the working space 24 but also, for example, the distance of the lower guide surface 41 from the workpiece support 16. An advantageous volumetric ratio according to the invention is normally with a higher main flow with respect to the secondary flow. It is suggested that an optimum volume ratio is in the range of 95/5 to 75/25. The optimum volume flow ratio may also be dependent on the size and geometry of the workpiece 17. The volume flow ratio can be adjusted, for example, by means of pressure losses, which can be generated by means of the grid-like apertures 34 on the (upper) supply air channels 6, 10 and by means of the grid-like apertures 40 on the (lower) supply air channels 8, 11.

In addition to the vacuum pump 22, blowers for air supply can be provided on the supply air channels 6, 8, 10, 11, and a setting of the volumetric ratio can also be made possible through them.

Due to the flow conditions in the interior of the housing 2 generated by means of the (upper) supply air channels 6, 10 and the lower supply air channels 8, 11, emissions due to machining in the working space 24 of the laser machine 1 are at least approximately completely captured and discharged along the shortest possible way from the working space 24. The region of the working space 24 located on the access side 3 of the housing 2 and the workpiece support 16 is intensively flowed through by supply air and thereby kept free from machining-related emissions. Personnel who enter the working space 24, for example, for loading and unloading the workpiece support 16 or performing maintenance and repair work in non-productive working hours, are therefore not exposed to machining-related emissions.

What is claimed is:

1. A laser machine for machining workpieces by means of a laser, the machine comprising:
    a housing defining a working space within the housing;
    an air supply;
    a workpiece support disposed within the working space for supporting a workpiece to be machined, the workpiece support defining a support main plane and being permeable to air perpendicularly to the support main plane, such that supply air may be directed, by means of the air supply, to an upper side of the workpiece support, with a flow direction perpendicular to the support main plane of the workpiece support, and that, by means of the air supply, supply air contaminated due to machining may be discharged as exhaust air from the upper side of the workpiece support through the workpiece support to a bottom side of the workpiece support spaced from the upper side of the workpiece support;
    wherein the air supply comprises a supply air channel, through which supply air flows to the upper side of the workpiece support, with the supply air channel defining a channel inlet and a channel outlet and having a flow cross section perpendicular to a flow direction of the supply air, the channel outlet directed towards the workpiece support and spaced from the upper side of the workpiece support and at least partially covering the workpiece support;
    wherein the flow cross section of the supply air channel is divided into partial cross sections by partial cross sectional walls that delimit the partial cross sections, extend in the flow direction and are aligned parallel to each other towards the channel outlet of the supply air channel, and extend perpendicularly to the support main plane of the workpiece support;
    wherein the working space contained by the housing and containing the workpiece support is delimited by a partition arranged within the housing and delimiting the working space with respect to a residual space formed within the housing, the partition extending perpendicularly to the support main plane of the workpiece support and the partition being spaced from the channel outlet of the supply air channel and open towards an access side of the workpiece support where the housing has an access-side wall;
    wherein a portion of the channel outlet protrudes beyond the workpiece support, the machine further comprising a guide surface laterally adjacent the workpiece support, arranged to guide supply air exiting the protruding portion of the channel outlet toward the upper side of the workpiece support; and
    wherein the supply air channel is an upper supply air channel, the laser machine further comprising a lower supply air channel at the bottom side of the workpiece support, through which lower supply air channel a secondary supply of air is directed as a secondary supply air flow having an initial flow direction parallel to the support main plane of the workpiece support to a lower guide surface arranged laterally beside the workpiece support, the lower guide surface arranged to deflect the secondary supply air flow from the initial flow direction into a flow direction perpendicular to the support main plane of the workpiece support and extending towards the upper side of the workpiece support.

2. The laser machine according to claim 1, wherein the supply air channel is provided with an undivided flow cross section over a partial length, which extends as an inflow length from the channel inlet of the supply air channel in the flow direction of the supply air.

3. The laser machine according to claim 1, wherein the partial cross sectional walls of the supply air channel are equally spaced at their outlet-side end lengths.

4. The laser machine according to claim 1, wherein the partial cross sectional walls of the supply air channel are non-uniformly spaced at inlet-side ends of the partial cross sectional walls, which inlet-side ends are directed towards the channel inlet of the supply air channel.

5. The laser machine according to claim 1, wherein the partial cross sectional walls have ends that are offset from one another in the flow direction of the supply air.

6. The laser machine according to claim 1, wherein the supply air channel defines an aperture, on an upstream side of the partial cross sectional walls, through which aperture the supply air passes.

7. The laser machine according to claim 1, wherein the flow direction of the supply air varies between the channel inlet and the channel outlet, the partial cross sectional walls forming guide surfaces for the supply air flowing towards the workpiece support, such that the supply air flowing towards the workpiece support is redirected by the partial cross sectional walls between the channel inlet and the channel outlet.

8. The laser machine according to claim 7, wherein the partial cross sectional walls form guide surfaces that redirect the supply air flowing towards the workpiece support at a right angle.

9. The laser machine according to claim 1, wherein the partition is partially formed by a machine body of a laser processing machine that is arranged within the housing.

10. The laser machine according to claim 1, wherein the channel outlet covers a cross section of the working space defined within the partition and parallel to the support main plane of the workpiece support.

11. The laser machine according to claim 1, wherein the partition of the working space is open towards an access side of the workpiece support, laterally adjacent the workpiece support, and wherein the housing of the laser machine has a closable access opening at the access side of the workpiece support.

12. The laser machine according to claim 1, wherein the protruding portion of the channel outlet of the supply air channel protrudes toward an access side of the workpiece support, and wherein the guide surface is disposed at the access side of the workpiece support.

13. The laser machine according to claim 1, wherein the lower guide surface is a portion on the housing of the laser machine.

14. The laser machine according to claim 1, wherein the secondary supply air flow is deflected from the initial flow direction into the flow direction at an access side of the workpiece support.

15. The laser machine according to claim 1, wherein the secondary supply air is directed as a laminar secondary supply air flow having the initial flow direction to the lower guide surface, and wherein the lower supply air channel has a flow cross section divided into partial cross sections by partial cross sectional walls that delimit the partial cross sections, extend in the flow direction of the secondary supply air with a wall distance transverse to the flow direction of the secondary supply air and are aligned with guide-surface-side end lengths, extending in the flow direction of the secondary supply air and ending towards a guide-surface-side channel outlet of the lower supply air channel, and that are parallel to each other in the initial flow direction of the secondary supply air.

16. The laser machine according to claim 15, wherein the lower supply air channel is provided, over a partial length extending from a guide-surface-remote channel inlet of the lower supply air channel in the flow direction of the secondary supply air, with an undivided flow cross section.

17. The laser machine according to claim 15, wherein the partial cross sectional walls of the lower supply air channel extend in the flow direction of the secondary supply air with a uniform wall distance.

18. The laser machine according to claim 15, wherein the partial cross sectional walls of the lower supply air channel are equally spaced at their guide-surface-side end lengths.

19. The laser machine according to claim 15, wherein the partial cross sectional walls of the lower supply air channel are non-uniformly spaced at inlet-side ends of the partial cross sectional walls, which inlet-side ends are directed towards a channel inlet of the lower supply air channel remote from the lower guide surface.

20. The laser machine according to claim 15, wherein the partial cross sectional walls of the lower supply air channel have ends that are offset from one another in the flow direction of the secondary supply air.

21. The laser machine according to claim 15, wherein the lower supply air channel defines an aperture, on an upstream side of the partial cross sectional walls, through which aperture the secondary supply air passes.

22. The laser machine according to claim 15, wherein the flow direction of the secondary supply air varies between a channel inlet of the lower supply air channel remote from the lower guide surface and the channel outlet of the lower supply air channel, and wherein the partial cross sectional walls of the lower supply air channel form guide surfaces for the secondary supply air, such that the secondary supply air may be deflected by the partial cross sectional walls of the lower supply air channel between the channel inlet of the lower supply air channel and the channel outlet of the lower supply air channel.

23. The laser machine according to claim 22, wherein the partial cross sectional walls of the lower supply air channel form guide surfaces that deflect the secondary supply air at a right angle.

24. The laser machine according to claim 15, wherein the lower supply air channel is one of multiple lower supply air channels with guide-surface-side channel outlets arranged side by side in parallel to the support main plane of the workpiece support.

25. The laser machine according to claim 1, wherein the upper supply air channel is one of multiple upper supply air channels with channel outlets arranged side by side in parallel to the support main plane of the workpiece support.

26. The laser machine according to claim 1, wherein the supply air channel is configured to direct the supply air as a laminar air flow to the upper side of the workpiece support.

* * * * *